(12) United States Patent
Glucksman et al.

(10) Patent No.: US 8,910,564 B2
(45) Date of Patent: Dec. 16, 2014

(54) ELECTRICAL APPLIANCE FOR PREPARING, STORING AND DISPENSING HOT BEVERAGES

(75) Inventors: Dov Z. Glucksman, Danvers, MA (US); Gary P. McGonagle, Lynn, MA (US); Laura J. Nickerson, Fitchburg, MA (US)

(73) Assignee: Appliance Development Corporation, Danvers, MA (US)

( * ) Notice: Subject to any disclaimer, the term of this patent is extended or adjusted under 35 U.S.C. 154(b) by 111 days.

(21) Appl. No.: 13/297,625

(22) Filed: Nov. 16, 2011

(65) Prior Publication Data
US 2012/0125205 A1    May 24, 2012

Related U.S. Application Data

(60) Provisional application No. 61/415,202, filed on Nov. 18, 2010.

(51) Int. Cl.
*A47J 31/057* (2006.01)
*A47J 31/32* (2006.01)

(52) U.S. Cl.
CPC ........................................ *A47J 31/32* (2013.01)
USPC ........................................................ 99/302 R

(58) Field of Classification Search
USPC ................ 99/292, 300, 302 R, 307, 316, 279
See application file for complete search history.

(56) References Cited

U.S. PATENT DOCUMENTS

| | | | |
|---|---|---|---|
| 6,351,475 B1 | 2/2002 | Okamura | |
| 6,672,200 B2 | 1/2004 | Duffy et al. | |
| 7,398,726 B2 | 7/2008 | Streeter et al. | |
| 7,461,586 B2 | 12/2008 | Garman et al. | |
| 2006/0000363 A1 | 1/2006 | Streeter et al. | |
| 2007/0056994 A1* | 3/2007 | Woodnorth et al. | 222/221 |
| 2007/1086780 | 8/2007 | Clark | |
| 2008/0072766 A1 | 3/2008 | Kobylarz | |
| 2009/0258114 A1* | 10/2009 | Lassota et al. | 426/78 |

* cited by examiner

*Primary Examiner* — Dana Ross
*Assistant Examiner* — Brandon Harvey
(74) *Attorney, Agent, or Firm* — George A. Herbster (57) ABSTRACT

A hot beverage maker produces a brewed beverage in a sealed infusion compartment. An air pump and selector establish a first flow path by which a pressure differential established by the air pump displaces water from a container, through a heater to the infusion compartment and then to a brewed beverage container. A second flow path produces a pressure in the brewed beverage container that displaces brewed beverage out a delivery spout.

2 Claims, 7 Drawing Sheets

ELECTRICAL APPLIANCE FOR PREPARING, STORING AND DISPENSING HOT BEVERAGES

BACKGROUND OF THE INVENTION

1. Field of the Invention

This invention relates to an electrical appliance for preparing a hot beverage, for storing such a beverage at the appropriate temperature and under sanitary conditions and for conveniently dispensing a portion of the stored beverage on demand.

2. Description of Related Art

Many types and styles of hot beverage makers, especially coffee makers, are known and have been sold for many years. The most common coffee makers include a water reservoir and an electric heater for heating and delivering the water into a filter basket. The filter basket contains ground coffee where the water and the coffee grounds mix. The resulting brewed liquid or beverage flows by gravity into a carafe located below the filter basket.

There are many drawbacks associated with traditional coffee makers. For example, in traditional coffee makers the first few cups are usually consumed soon after brewing, so they have a good taste. However, after a short time, the remaining coffee becomes bitter due to overheating and oxidation of the beverage in the carafe. It is recognized that the optimal brewing time for coffee is 5 minutes. Traditional coffee makers require up to 10 minutes of brewing time for a carafe of coffee, resulting in an over extracted beverage. Often such coffee makers dispense the beverage into glass carafes that are subject to breakage as they are frequently removed from and returned to the coffee maker whenever a cup is being poured.

More recently single-serve coffee makers have made an appearance in the market place and have overcome the foregoing problems found in traditional coffee makers. A typical single-serve coffee maker maintains a supply of water at a temperature suitable for brewing coffee. A premeasured amount of coffee is placed in a brew chamber. The brew chamber is sealed during the brewing process, so a water pump can deliver heated water into the brew chamber to mix with the coffee. The brewed liquid then flows into a properly positioned cup.

While single-serve coffee makers overcome many drawbacks of the traditional coffee makers, they also have a number of drawbacks. If a number of people want to be served coffee at the same time from the same single-serve coffee maker, each person has to wait for their coffee while a fresh portion of ground coffee is added and water is reheated in that coffee maker. Normally, such single-serve coffee makers use coffee prepackaged in pods or capsules. Such pods and capsules are more expensive than ground coffee.

Now another concept in coffee makers, known as "brew stations," has been introduced to overcome single serve coffee brewer drawbacks. In a brew station a coffee brewer brews a quantity of coffee (e.g. a "pot"). Rather than dispensing the entire quantity of brewed beverage into a carafe or the like, the beverage is retained in an internal container with a spigot. The user can dispense a portion of a cup, a cup or many cups consecutively without having to brew each cup separately. U.S. Pat. No. 6,351,475 (2002) to Okamura; and U.S. Pat. No. 7,461,586 (2008) to Gorman et al. describe such a coffee brewers.

Brew stations use the water heating and delivery systems such as those used in the traditional coffee brewer. Consequently, drawbacks of traditional coffee makers are present in these brew stations; that is, the user has a long interval from the beginning of the brewing cycle and the end of the brewing interval cycle. Beverage quality suffers due to the same extended brew time of traditional coffee makers. These brew stations have a spigot for dispensing the beverage that must be located at the bottom of the brewed liquid container, adding significantly to the height of the appliance. The spigot also is difficult to clean and may harbor bacteria and other health hazards.

What is needed is a coffee maker that allows brewing of a multiple-cup quantity of coffee, that stores the brewed liquid in the appliance, that enables the coffee to be dispensed by the user a cup at a time on demand, and that maintains beverage quality.

SUMMARY

Accordingly, it is an object of the present invention to overcome the foregoing drawbacks and provide a hot beverage maker for dispensing a portion of a cup, a cup, or multiple cups of a beverage on demand.

Another object of the present invention is to provide a hot beverage maker characterized by an infusion time than is significantly shorter than infusion times encountered in typical drip coffee makers in order to avoid over extraction of coffee, thereby to obtain a more flavorful and aromatic brew.

Yet another object of the present invention is to provide a hot beverage maker where hot water is delivered under pressure at high velocities to agitate the infusible material thereby to obtain a more flavorful and aromatic brew.

Still another object of the present invention to provide a hot beverage maker that is easy to clean.

Yet still another object of the present invention to provide a hot beverage maker which is intuitive and easy to use.

A further object of the present invention to provide a hot beverage maker to achieve all of the above by using common and low cost components.

Still a further object of the present invention to provide a hot beverage maker where most of the controls are easy to use.

Yet a further object of the present invention to provide a hot beverage maker where the user can visually determine the amount of infused liquid remaining to be dispensed.

In accordance with the present invention, a hot beverage maker comprises a fresh water container, a water heater having an outlet and an inlet connected to heat water from said fresh water container, a sealed infusion compartment for an infusible material having a brewed beverage delivery output and a liquid input connected to said water heater outlet, an infused beverage container that receives hot brewed beverage from said delivery output and that includes a delivery spout. An air pump establishes a pressure differential and a selector establishes different flow paths among a plurality of ports connected to said air pump and said brewed beverage container. During beverage brewing the selector establishes a flow path by which the air pump displaces fresh water in the container through the heater and the sealed infusion compartment into the infused beverage container and whereby during dispensing of the brewed beverage the selector establishes still another flow path by which the air pump displaces brewed beverage in the infused beverage container out the delivery spout.

BRIEF DESCRIPTION OF THE DRAWINGS

The various objects, advantages and novel features of this invention will be more fully apparent from a reading of the following detailed description in conjunction with the accompanying drawings in which like reference numerals refer to like parts, and in which.

DESCRIPTION OF ILLUSTRATIVE EMBODIMENTS

Figure 1:
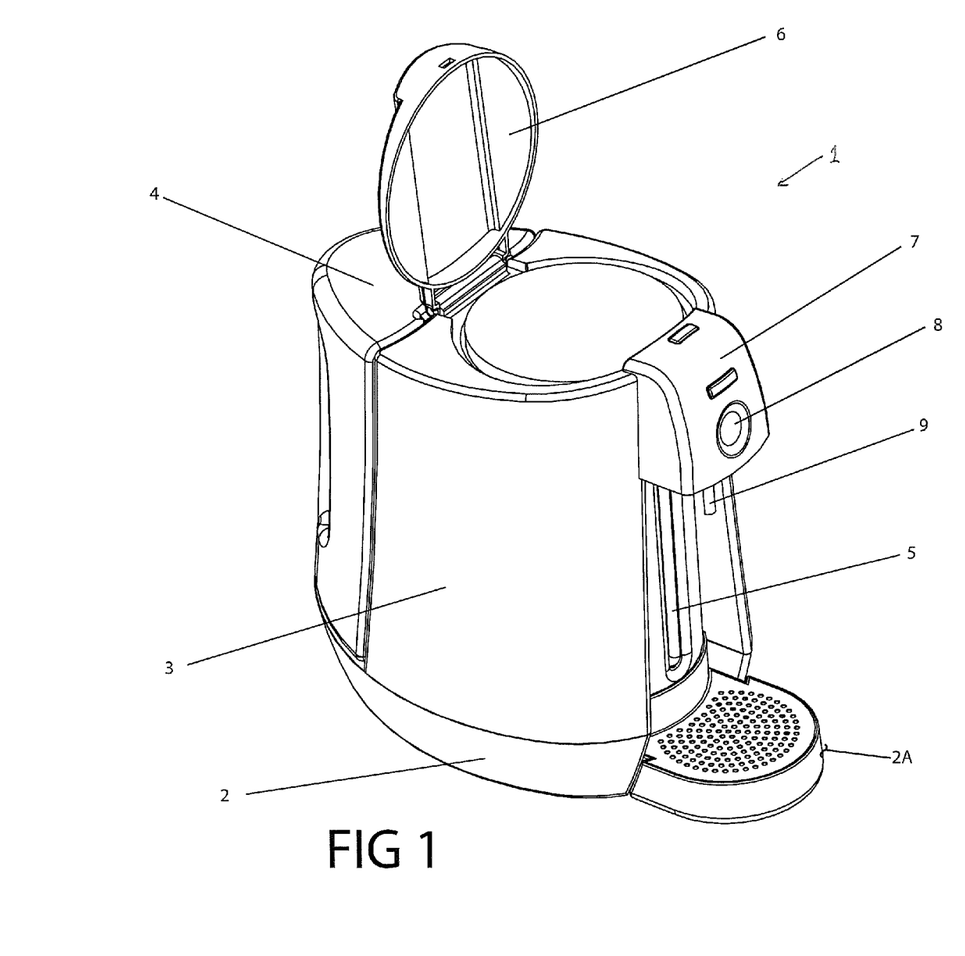
FIG. 1 is an isometric view of a hot beverage maker embodying the present invention.

FIG. 1 illustrates one embodiment of a hot beverage maker 1 according to the invention including a base 2 that supports all of the components, and featuring a drip tray 2A, facing the front of the hot beverage maker 1. An enclosure 3 houses all of the hot beverage maker components and attaches to the base 2. The base 2 supports a fresh water container 4, which is removable for filling by the user. Other components include a window 5 that allows a person to observe the remaining liquid level of brewed beverage available to be dispensed. A hinged lid 6 can be latched shut to create a pneumatically sealed compartment within the enclosure 3. The enclosure 3 also houses an infused liquid compartment (not shown in FIG. 1). A control panel 7 includes a push button 8 for dispensing infusible liquid through a dispensing spout 9.

Figure 2:
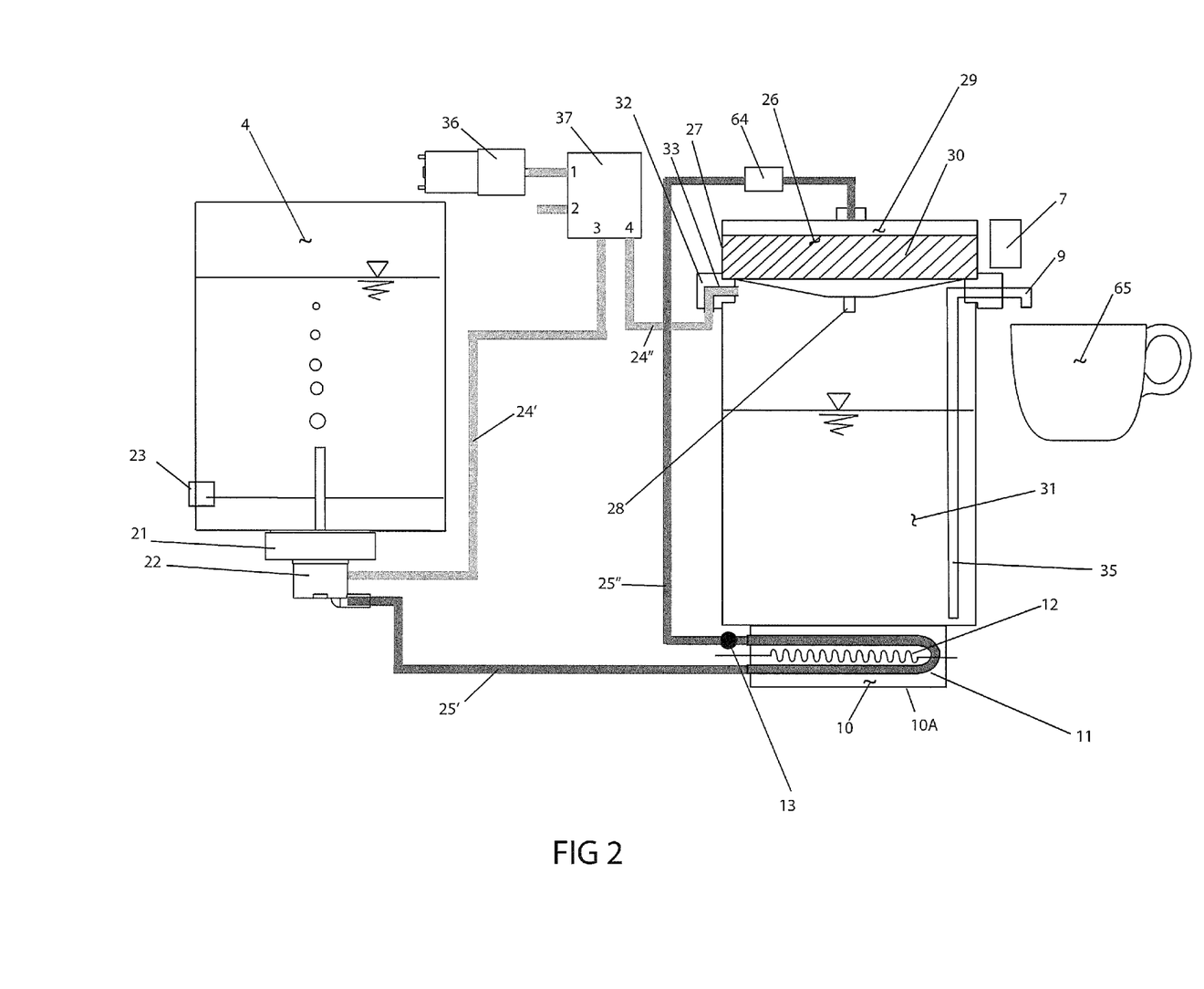
FIG. 2 is a schematic illustration of the hot beverage maker of FIG. 1 incorporating a thermoblock water heater.

In FIG. 2 a thermoblock heater 10 includes a metal block 10A with an integral water channel 11 and an embedded water heater 12. The thermoblock heater 10 heats water to a predetermined temperature as it passes through a water channel 11. A water temperature sensor 13 located downstream of the thermoblock heater 10 provides a measured temperature signal. Thermal controls, not shown, ensure that the thermoblock heater 10 elevates the temperature to and maintains the temperature at a set value. Selecting parameters for the thermoblock heater cross section, the water channel length and heater power are achieved by design for a particular water flow rate and temperature.

Figure 3:
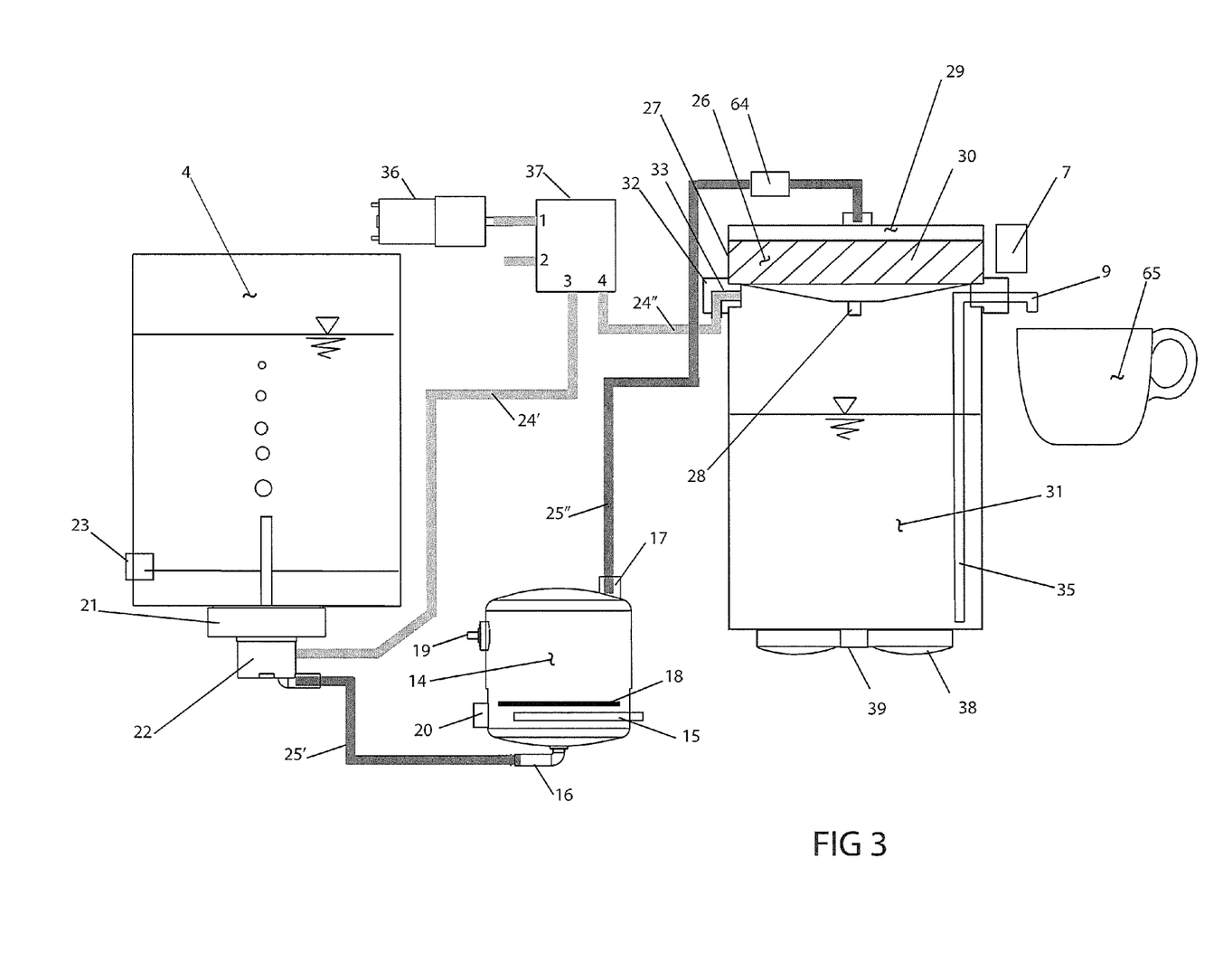
FIG. 3 is a schematic illustration of the hot beverage maker of FIG. 1 incorporating a volumetric water heater.

FIG. 3 depicts, as an alternative, a heating tank 14 of relatively large volume with an immersed electrical heating element 15, inlet and outlet water connections 16 and 17, an internal baffle 18, a temperature sensor 19 and a thermal safety switch 20. The baffle 18 ensures that cold water remains in the vicinity of the heater 15. The temperature sensor 19 protrudes into the tank 14 for sensing the water temperature and provides an input to thermal controls that maintain a pre-specified water temperature. The thermal safety switch 20 ensures that the tank 14 does not exceed a safe operating temperature.

Referring now to the embodiments of FIGS. 2 and 3, each has a fresh water container 4 which is hermetically sealed by a screw-on lid 21. The lid 21 can be removed from the appliance in order to fill it with fresh tap water or to clean it, as needed. The fresh water container 4 is placed upside down in the appliance with its lid 21 fitting into a well 22 designed to receive the lid 21 in a sealed connection. The lid 21 features two separate passages (not shown). One is for air; the other, for water. Both passages are designed to provide sealed passages for air and water and are incorporated in the well 22. They are internally connected to external connections in the form of an air line 24' and a water line 25', respectively. The container 4 also includes a Hall Effect sensor 23 that monitors the level of water in the water container 4 and interrupts the operation of an air pump 36 when the level falls below a predetermined level.

In each of the foregoing and other embodiment disclosed herein, an infusion process takes place in an infusion compartment 26, which consists of a lower portion fashioned as a basket 27 with a brewed beverage delivery output in the form of an infused liquid dispensing aperture 28. The body portion also features filtering means for trapping all of the solids and ensuring that only infused liquid is dispensed and a liquid input for receiving heated water from the water heater, such as the water heater 14 in FIG. 3. The infusion compartment 26 further contains a cover 29, which during the infusion process is hermetically sealed to the basket 27. The cover 29 includes means for distributing the water over the infusible material 30 (not shown, but known in the prior art).

The infused liquid or brewed beverage is dispensed from the infusion compartment 26 into an infused liquid container 31, where it is stored at an appropriate serving temperature by a warming source. The infused liquid container 31 also includes a seal 32 incorporating an air passage 33 for pressurizing the container as required for the operation of the appliance. The seal 32 also includes the spout 9 with its distal end extending out of the container, at a point above the highest liquid level in the container, to avoid any siphoning effect. The other end of the spout 9 is connected to a tube 35 reaching into and extending towards the lowest point of the infused liquid container 31.

Still referring to FIGS. 2 and 3, the bottom of the infusion compartment 26 acts as the lid of the infused liquid container 31 with the seal 32 placed therebetween. A clamping fixture holds the compartments so they are properly sealed. Such clamping fixtures are known in the art and are therefore not shown.

The air pump 36 generates sufficient air flow and pressure to overcome the back pressure imposed during the infusion process. During the brew cycle a selector 37 establishes a flow path that directs air from the air pump 36 into the fresh water container 4. This displaces water in the sealed fresh water container 4 into the water line 25', through the heater 10 in FIG. 2 or the heater 14 in FIG. 3 and into the infusion compartment 26. The water is delivered under the pressure differential established by the air pump 36 and at a high velocity to agitate the infusible material within the infusion compartment and to obtain a more flavorful and aromatic brew. From the infusion compartment 26 the infused liquid flows into the infused liquid container 31. When liquid is to be dispensed from the infused liquid container 31, the selector 37 establishes a different flow path and directs air from the air pump 36 into the sealed infused liquid container 31 and forces the infused liquid through the tubing 35 and out of the spout 9 and into a cup 65. A check valve 64 in water line 25" leading to the infusion compartment 26 prevents air from escaping from the infused liquid container 31 during the infusion process.

As shown, the selector valve 37 has four ports and can be operated electrically or manually. More specifically, when the selector valve 37 is in its "infuse" position, ports 1 and 3 are connected, so air from the pump 36 flows into the fresh water container 4 to push the water through the system. At the same time ports 2 and 4 are connected to vent the infused liquid container 31 to atmosphere and to allow the free flow of infused liquid into the container. When the selector valve 37 is in its "dispense" position, ports 1 and 4 are connected whereby air flows from air pump 36 into the infused liquid container 31 to pressurize it so that the infused liquid can be dispensed through the spout 9.

Once a beverage has been brewed, the coffee maker stores the infused liquid at an optimal temperature for consumption (i.e., a "serving temperature"). FIGS. 2 and 3 illustrate two of several options for keeping the infused liquid at the serving temperature. In FIG. 2 the infused liquid container 31 is seated on the thermoblock heater 10 which is controlled to maintain the liquid at the serving temperature. FIG. 3 shows, as an alternate, a separate keep-warm heater 38 of a type that is known in the art. The heater is preferably shaped as a disk with a center aperture where a thermostat 39 is located. This configuration is advantageous as it permits the sensor to sense the temperature of the container itself and to signal when the heater should be turned on and off.

Figure 4:
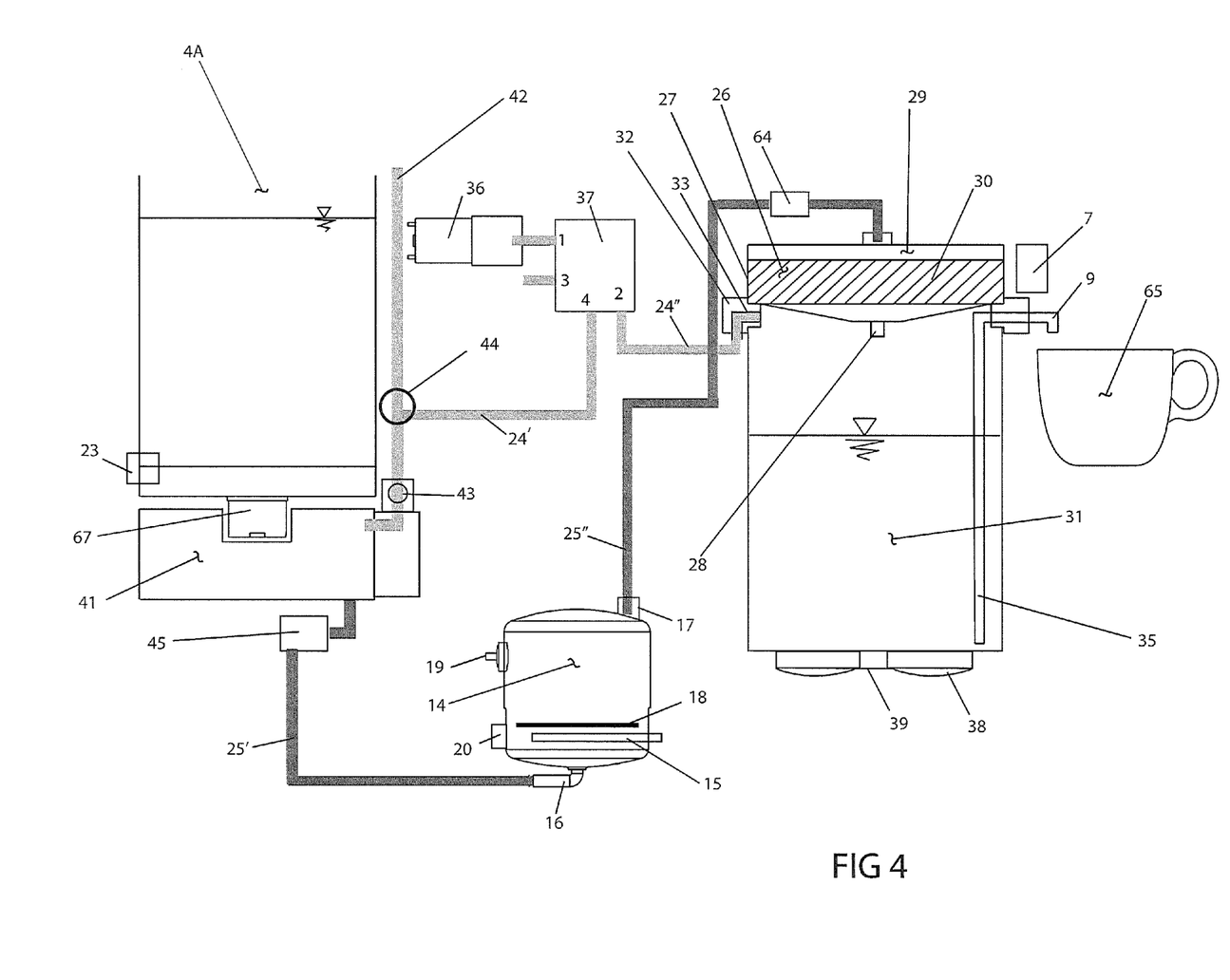
FIG. 4 is a schematic illustration of another hot beverage maker of FIG. 1 incorporating a volumetric water heater.

FIG. 4 depicts a coffee maker which is similar in all respects to the coffee maker in FIG. 3, except as to the specific implementation of fresh water container 4. In FIG. 4 a fresh water container 4A is open to the atmosphere, as some people, especially the elderly, may find it difficult to tighten a lid on a container. Since the open fresh water container 4A cannot be pressurized for delivery of water, an auxiliary sealed container 41 is added in FIG. 4. The auxiliary container 41 is connected to air line 24' and has a water line 25' connected to the water heater 14. The auxiliary container 41 is located below the open fresh water container 4A so that water can flow from the open fresh water container 4A into the auxiliary container 41 and the heater 14 through an intermediate check valve. A check valve 45 prevents water from flowing back into the open fresh water container 4A.

The auxiliary container 41 has an air vent which is open to the atmosphere to vent the container as water flows from the fresh water container 4A into the auxiliary container 41. A vent tube 42 attaches to the container 41 at its highest point via a float valve 43 that prevents water from rising up the vent tube 42. The vent tube 42 also connects to the pressurized air line 24' intermediate the opening and the float valve 43 and a bleeder valve 44. The bleeder valve 44 allows air to flow through it so long as the flow rate in the vent tube is below a certain threshold. When the flow rate exceeds that threshold, such as when the air pump 36 is engaged, the bleeder valve 44 remains closed to the atmosphere while permitting the uninterrupted flow of air from the air pump 36 into the auxiliary container 41. Such bleeder valves are known in the art.

During brewing, it is necessary to deliver water from the auxiliary container 41 to the infusion compartment 26. A check valve 67 is positioned between the fresh water container 4A and the auxiliary container 41 so water will only flow through the heater and into the infusion compartment 26, as discussed in reference to the embodiments shown in FIGS. 2 and 3.

The auxiliary container 41 is small. It must be refilled from time to time with water from the fresh water container 4A. To accomplish that the air pressure in the auxiliary container 41 must be relieved. When that happens the check valve 67 opens to allow gravity to refill the auxiliary container 41. This can be achieved in a number of ways, for example by turning the air pump 36 on and off intermittently, or by installing a valve in the air line 24' that will be programmed to open and close intermittently. This effect can also be achieved by a combination of the two approaches. Depending on the size relationship of the two containers the refilling of the auxiliary container 41 may have to occur several times during the infusion cycle. Since the infusion cycle cannot be interrupted or extended, the refilling of the auxiliary container 41 must happen quickly and in short spurts, such that water flow to the infusion compartment 26 is not interrupted. Therefore the relationship between the two containers and the frequency of the cycles must be determined during the design process of the appliance.

Figure 5:
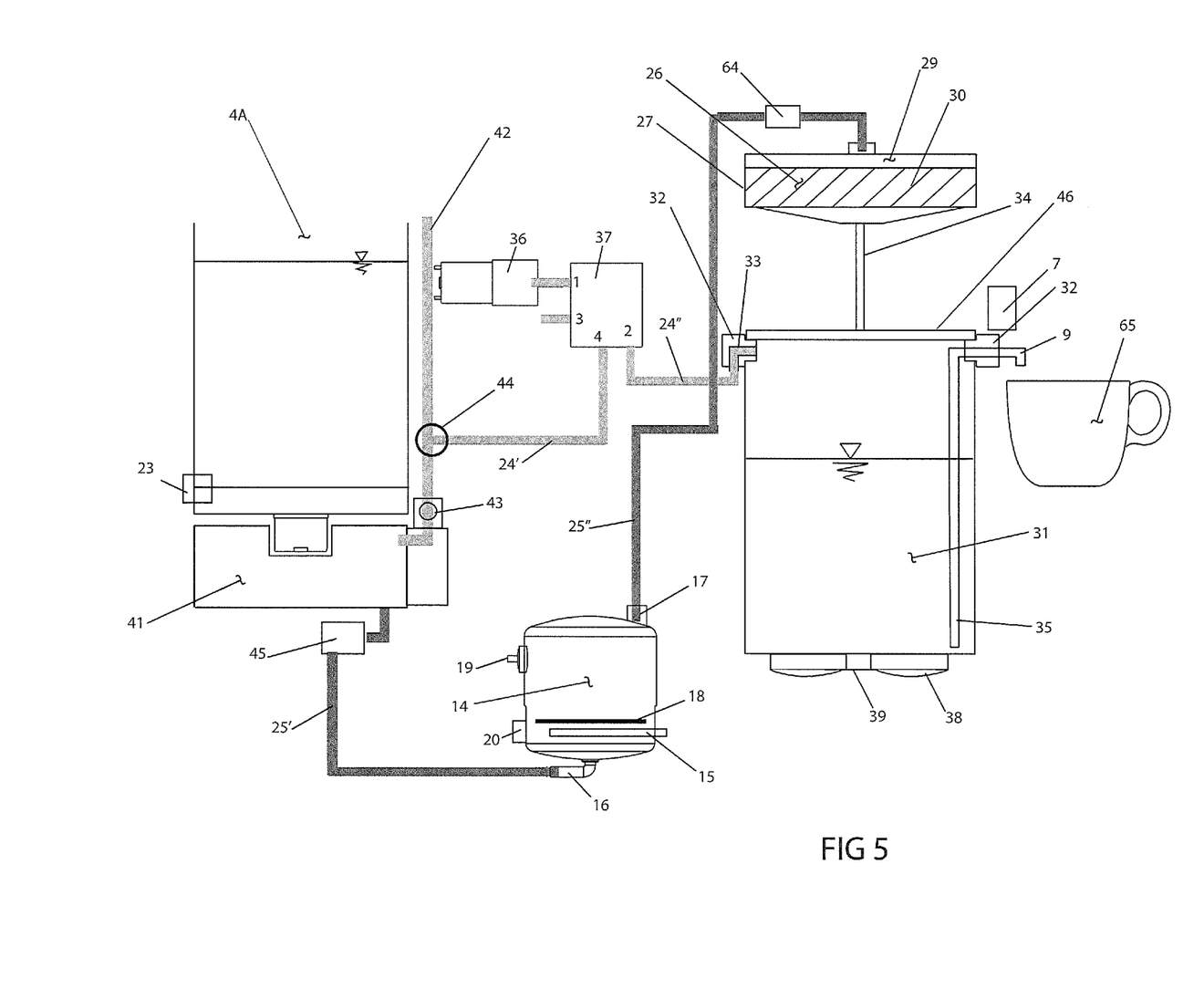
FIG. 5 is a schematic illustration of another hot beverage maker of FIG. 1.

FIG. 5 is similar to FIG. 4, except that the infusion compartment 26 is physically removed from and connected to the infused liquid container 31 through infused liquid tubing 34. A separate lid 46 spans and seals the infused beverage container 31 and has an appropriate clamp, as known in the art. When the infusion compartment 26 is sealed and pressurized during the infusion process, the infusion compartment 26 does not have to be located physically above the infused beverage container 31, as the infused liquid is delivered by the internal pressure and can be delivered to a remote location via flexible or rigid tubing.

Figure 6:
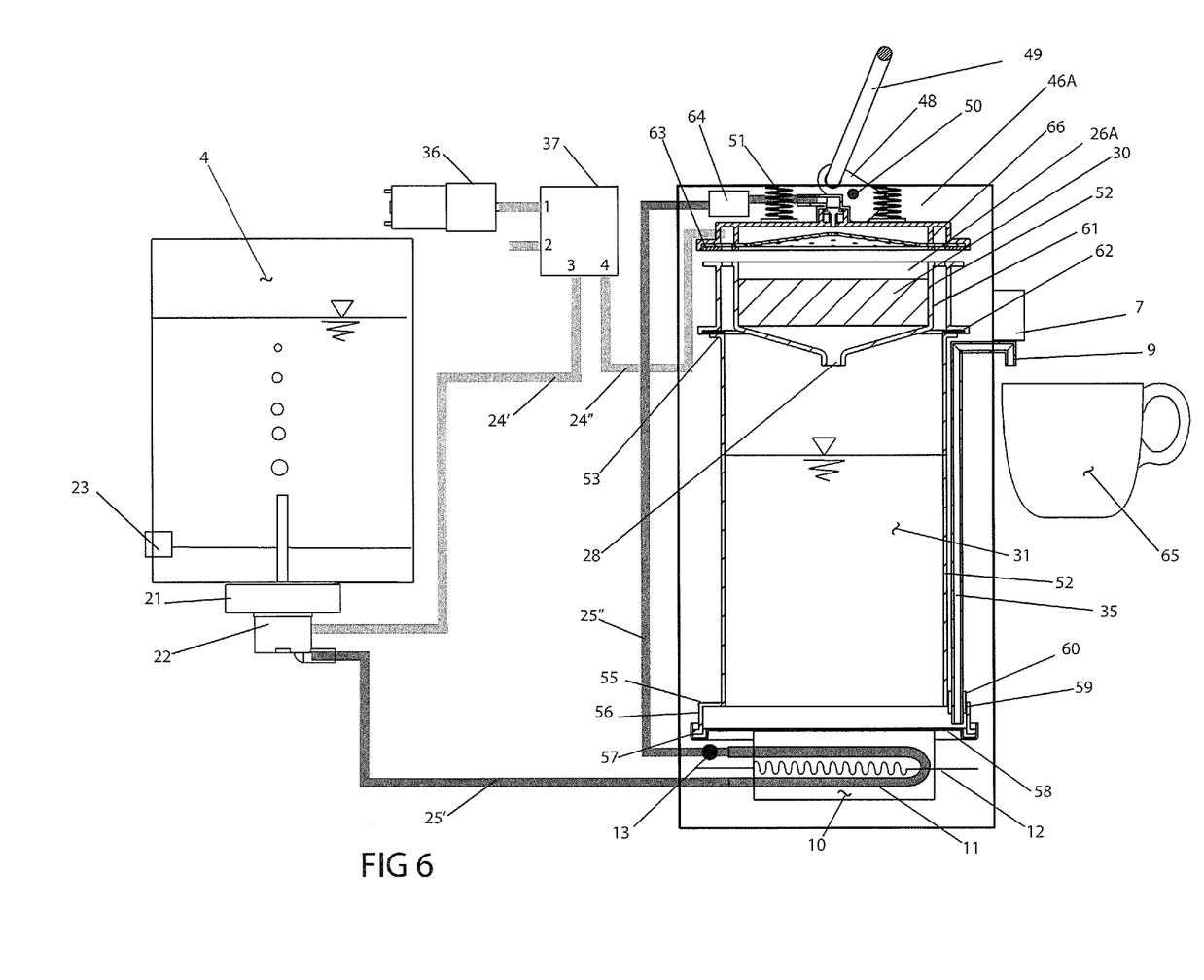
FIG. 6 is yet another schematic illustration of the hot beverage maker of FIG. 1.

FIG. 6 is similar to FIG. 2 except that FIG. 6 illustrates specific example of a clamp in the form of a toggle 47 used for maintaining an infusion chamber 61 and the infused liquid container 31 in a sealed condition, as needed for the infusion process and for the dispensing process. The toggle 47 comprises a hinged cam 48 and a lever 49. A hinge pin 50 attaches to the enclosure 3. Two tension springs 51 between the toggle 47 and the enclosure 3 separate the parts from each other when the toggle 47 is brought to its rest position as shown in FIG. 6.

FIG. 6 also depicts an alternate implementation of an infused liquid container 31. It comprises a cylindrical main body 52, molded of a plastic material such as polypropylene, with a flange 53 at its upper face, and a circumferential step at the lower end of the container comprising a radial portion 55 and a downwardly extending cylindrical portion 56 terminating in another radial flange 57. The lower radial flange 57 is swaged, or otherwise affixed, along its entire perimeter to a metal plate 58, suitable to contact the thermoblock heater 10 thereby to provide an efficient heat transfer path to the infused liquid to maintain it in its serving temperature.

A tube 35 extends from an aperture 59 in the radial portion 55 and is sealed in place by a stopper 60, such as a stopper molded of silicone rubber. The vertical tube 35 has an upper end fashioned as the spout 9 to deliver infused liquid into the cup 65. The vertical tube 35 is preferably transparent, so it can be used as a liquid level indicator.

The body portion of an infusion chamber 26A is designed with a concentric ring structure 61 forming two concentric compartments. The inner compartment holds infusible material 30; the outer compartment constitutes a passage for air required to pressurize the infusible material 30 for dispensing infused liquid into the cup 65. The infusion chamber also features a seal 62 made of silicon rubber for example for sealing against the upper flange 53 of the infused liquid compartment 31 when the two components are held firmly against each other. The body portion is designed to slide in and out of the apparatus for cleaning and refilling with infusible material.

A lid 46A for the infusion chamber 26A is also comprises a concentric ring structure 66 forming two concentric compartments. The inner compartment constitutes a water distributor that assures even distribution of the heater water over the infusible material. It is connected to the hot water line 25". The outer compartment serves as an air passage for air from the air line 24". The lid 46A also features a seal 63 that is intermediate the lid and the body portion when the two components are held firmly against each other. All three components are supported in axial alignment.

Figure 7:
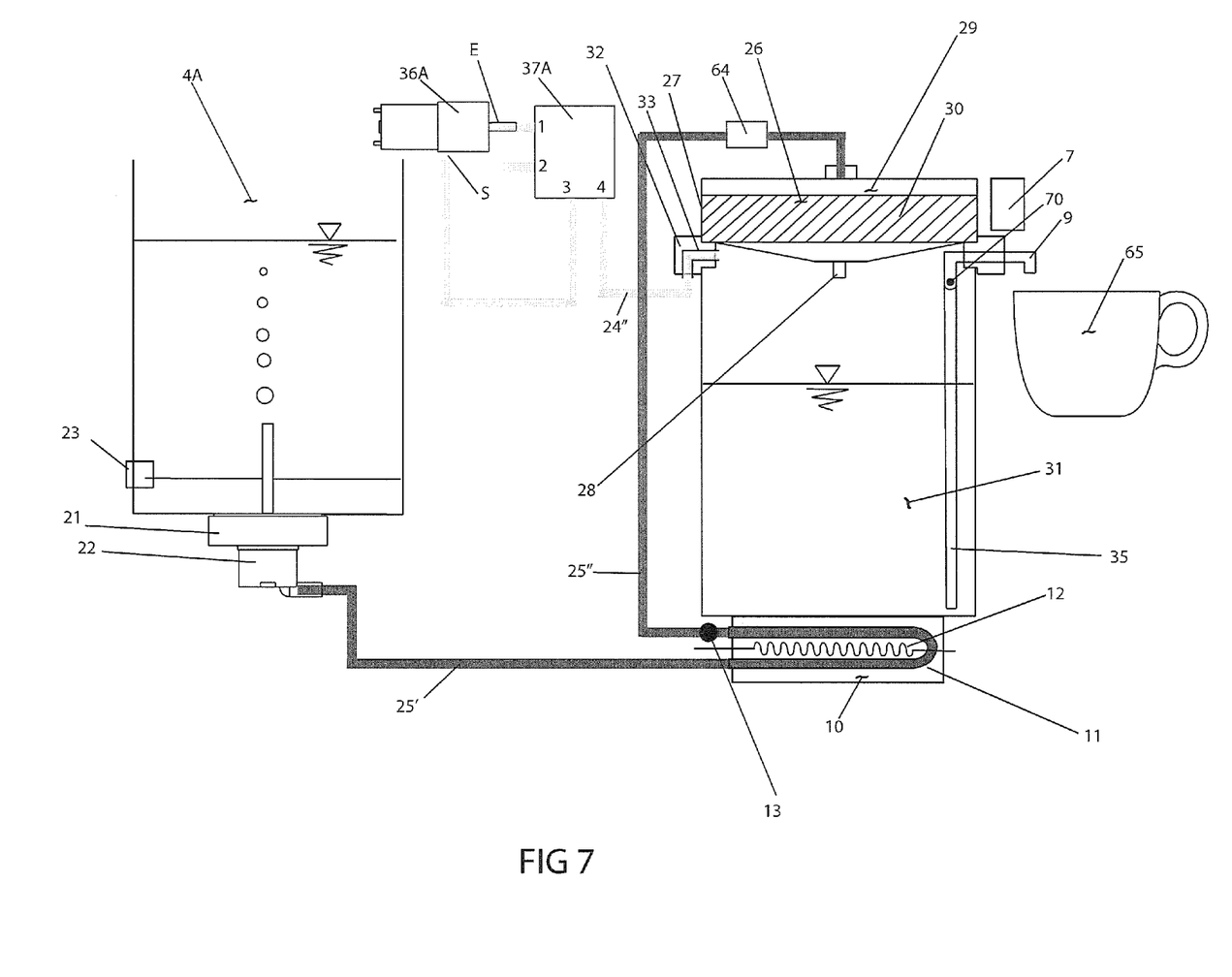
FIG. 7 is a schematic illustration of still another hot beverage maker of FIG. 1.

Referring now to FIG. 7, the hot beverage maker basically has certain differences from the embodiment of FIG. 2. One difference is that the water tank 4A is open to the atmosphere, not sealed during brewing. A second check valve 70 is located in the delivery tube 35. The air pump 36A has an exhaust output E and a suction input S connected to ports 1 and 3 of a selector 37A, respectively. Port 2 vents to the atmosphere; and port 4 attaches to an air line 24" to the infused liquid container 31. During the brew cycle the selector 37A is set to an "infuse" position. In this position, the selector 37A establishes a first flow path between ports 1 and 2 and a second flow path between ports 3 and 4 whereby the air pump 36A draws air out of the infused liquid container 31 through an air line 24" to create an under-pressure in the container 31. During this process a check valve 70 in the tube 35 closes. Consequently, atmospheric pressure in water container 4A drives water through the water line 25', the thermoblock heater 10 and the water line 25" into the infusion compartment 26. During this time exhaust air from the air pump 36A passes through the flow path between ports 1 and 2.

When liquid is to be dispensed from the infused liquid container 31, the selector 37A is moved to a "dispense" position that establishes a flow path between ports 1 and 4 and another flow path between ports 2 and 3. In this state, air under pressure from the air pump 36A is directed through ports 1 and 4 to the sealed infused liquid container 31 thereby to force the infused liquid through the tubing 35, past the check valve 70, out of the spout 9 and into the cup 65. During this time air is drawn into the air pump 36A through the flow path between ports 3 and 2.

From the foregoing, it will be apparent that the each of the foregoing embodiments meets some or all of the objectives of this invention. Each is a coffee maker that can brew multiple cups of coffee, store that coffee at a serving temperature for an extended time and permit on-demand dispensing of coffee for one or multiple cups. The use of pressurized water in the infusion process increases the flow rate and the velocity of the water across the infusion compartment. This optimizes the infusion process by agitating the coffee to obtain a more efficacious process and by maintaining a shorter brewing process. It will be apparent that the coffee maker is intuitive to use and to maintain. Most components for this coffee maker are available at low cost and are readily assembled into a final product. Different arrangements involving the connection of the air pump 36 to other components of the disclosed hot beverage maker can be made. In each of these embodiments, the arrangement produces a pressure differential across a sealed infusion compartment. It will also be apparent that many modifications can be made to any of the disclosed embodiments. Still other fresh water container arrangements could be substituted to provide a fresh water source. Still other types of water heaters could be adapted to perform the function of the specifically disclosed water heaters. Other sealed infusion compartment and infused beverage container configurations could be substituted. It is the intent of the appended claims to cover such variations as come within the true spirit and scope of this invention.

What is claimed as new is:

1. A hot beverage maker for brewing multiple servings of a beverage comprising:
  A) an enclosure including a base,
  B) a fresh water container attached to said base,
  C) a water heater within said enclosure having an outlet water connection and an inlet water connection connected to heat water from said fresh water container,
  D) a sealed infusion compartment within said enclosure for an infusible material having a brewed beverage delivery output and a liquid input connected to said outlet water connection,
  E) an infused beverage container within said enclosure that receives and stores the hot brewed beverage from said brewed beverage delivery output and that includes a delivery spout,
  F) an air pump within said enclosure that establishes a pressure differential, and
  G) a selector valve with an inlet connected to said air pump, said selector valve having first and second positions and being within said enclosure that establishes flow paths among said air pump, said fresh water container and said infused beverage container, whereby during beverage brewing said selector valve establishes flow paths by which said air pump pressurizes said fresh water container and displaces fresh water through said heater and said sealed infusion compartment into said infused beverage container while also maintaining a flow path that vents said infused beverage container whereby during beverage dispensing from said infused beverage container said selector valve establishes another flow path by which said air pump pressurizes said infused beverage container and dispenses a portion of said multiple servings of brewed beverage through said delivery spout.

2. A hot beverage maker for brewing multiple servings of a beverage comprising:
  A) an enclosure including a base,
  B) a fresh water container attached to said base,
  C) a water heater within said enclosure having an outlet water connection and an inlet water connection connected to heat water from said fresh water container,
  D) a sealed infusion compartment within said enclosure for an infusible material having a brewed beverage delivery output and a liquid input connected to said outlet water connection outlet,
  E) an infused beverage container within said enclosure that receives and stores hot brewed beverage from said brewed beverage delivery output and that includes a delivery spout, and an air connection,
  F) an air pump within said enclosure that establishes a pressure differential, and
  G) a two-position selector valve within said enclosure with an inlet connected to said air pump discharge port that establishes different flow paths, whereby during beverage brewing said selector valve, in one position, establishes a flow path by which said air pump displaces fresh water through said heater and said sealed infusion compartment into said infused beverage container and a flow path that vents said infused beverage container and whereby during beverage dispensing from said infused beverage container said selector valve in a second position establishes another flow path by which said air pump pressurizes said infused beverage container and dispenses a portion of said multiple servings of brewed beverage through said delivery spout.

* * * * *